No. 723,304. PATENTED MAR. 24, 1903.
F. C. PRINDLE.
APPARATUS FOR MIXING BARK EXTRACTS.
APPLICATION FILED APR. 26, 1902.
NO MODEL.

Witnesses
F. C. Prindle
Inventor
Attorneys

UNITED STATES PATENT OFFICE.

FARRAND C. PRINDLE, OF HORNELLSVILLE, NEW YORK.

APPARATUS FOR MIXING BARK EXTRACTS.

SPECIFICATION forming part of Letters Patent No. 723,304, dated March 24, 1903.

Application filed April 26, 1902. Serial No. 104,852. (No model.)

*To all whom it may concern:*

Be it known that I, FARRAND C. PRINDLE, a citizen of the United States, residing at Hornellsville, in the county of Steuben and State of New York, have invented a new and useful Apparatus for Mixing Bark Extracts, of which the following is a specification.

This invention relates to apparatus for mixing bark extracts.

The object of the invention is in a ready, practical, rapid, and economical manner to effect mixing of all kinds of extracts or other materials and at the same time to dissolve hard extracts.

With these and other objects in view, as will appear as the nature of the invention is better understood, the same consists in the novel construction and combination of parts of an apparatus for mixing bark extracts and other materials, as will be hereinafter fully described and claimed.

In the accompanying drawings, forming a part of this specification, and in which like numerals of reference indicate corresponding parts, there is illustrated one form of embodiment of the invention capable of carrying the same into practical operation, it being understood that the elements therein exhibited may be varied or changed as to shape, proportion, and exact manner of assemblage without departing from the spirit thereof.

Figure 1:
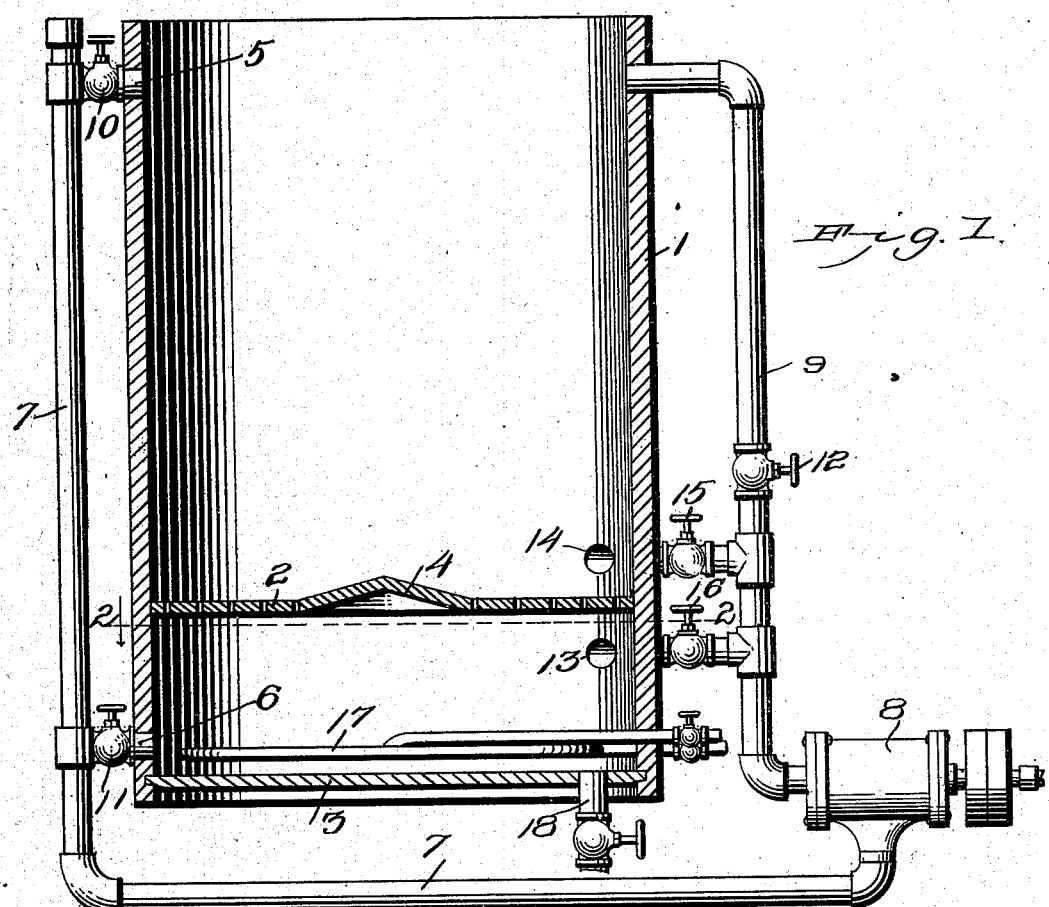
Figure 2:
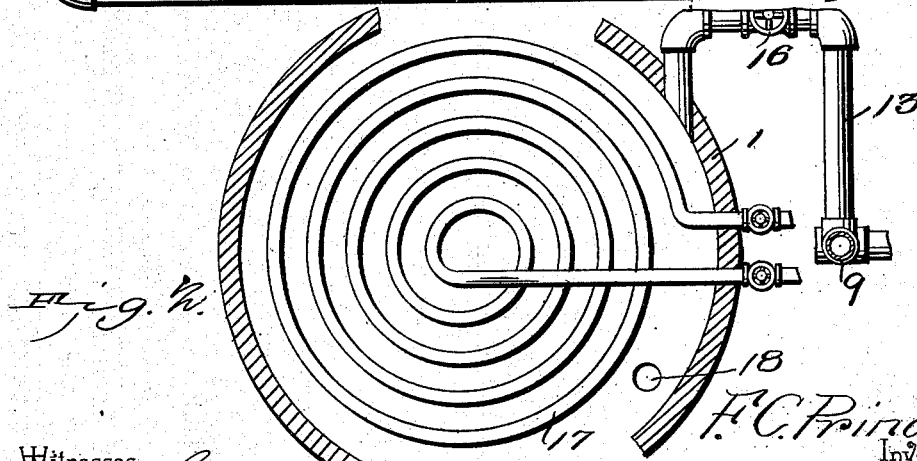

In the drawings, Figure 1 is a view in side elevation, partly in section, of an apparatus characterizing the present invention. Fig. 2 is a horizontal sectional view taken on the line 2 2, Fig. 1.

As is well known, in apparatus of this character it is a desideratum rapidly and continuously to circulate the extract or liquor to be strengthened in order to cause the said liquor to become as strongly impregnated or charged with the extract in as short a time as possible. Under the operation of the apparatus of this invention not only is the liquor repeatedly and rapidly withdrawn and returned to the tub or vat containing the extract, but the harder extracts are subjected to a treatment that tends to dissolve them, thereby to facilitate the operation and to save extracts that would otherwise be wasted. Furthermore, any tendency of the extracts to settle at the center of the false bottom upon which they are placed is prevented, thereby enabling the operator to utilize all of the extracts supplied to the apparatus.

The apparatus comprises a tub or vat 1, which may be constructed of any suitable material and is provided with a perforated false bottom 2, located any preferred distance above the bottom proper, 3. The center of the false bottom is imperforate and is cone-shaped at 4, the purpose of the cone being to prevent centering of the extract on the false bottom due to the centrifugal motion imparted thereto and also to direct the extract laterally in all directions toward the perforations in the false bottom.

Connecting with the vat through branch pipes 5 and 6, disposed, respectively, near its upper end and the bottom proper, is an exhaust-pipe 7, which connects with a rotary pump 8, and leading from the rotary pump is a supply-pipe 9, which enters the vat near its upper end. The pump may be of the usual or any preferred construction, and therefore needs no detailed description. Each of the branch pipes 5 and 6 carries a globe-valve 10 and 11, respectively, and the supply-pipe is provided with a similar valve 12. Connecting the supply-pipe with the vat are two branch pipes 13 and 14, which, as shown in Fig. 2, enter the vat in such manner as to cause the liquor discharged therethrough to impart a circular motion to the entire contents of the vat when such is desired, the said pipes being provided with valves 15 and 16, by which to close passage through them when desired.

Disposed upon the bottom proper of the vat is a coil or worm 17, connecting with a supply of steam, the purpose of which is to heat the liquor in the vat to effect the ready dissolving of the extract. The bottom also has associated with it a drain-pipe 18, provided with a suitable valve, the pipe being employed to empty the tub for cleaning purposes, &c.

In the operation of the device the vat is filled to the top with the liquor to be strengthened, and steam is turned into the coil 17 to heat the liquor, and the extract is then poured into the tub and spreads out on the false bottom 2. The pump is now started, and should it be desired to cause the liquor to be returned to the vat at its top the valves 11, 15, and 16 will be closed and the valve 12 opened. It will thus be seen that the liquor will be drawn through the branch pipe 5 into the exhaust-pipe 7, thence to the pump, and thence to the supply-pipe 9, back into the vat at its top. Should it be desired to circulate the liquor beneath the false bottom, the valves 10, 12, and 15 will be closed, and the path traversed by the liquor will be through the branch pipe 6, through the exhaust-pipe 7, to the pump, and from the pump to the branch pipe 13, back into the vat. Under the motion imparted to the liquor there is a tendency for the extract to work to the center of the false bottom and there accumulate; but this is prevented by the cone portion 4, which operates to deflect the extract laterally in all directions through the perforations in the bottom. Where the extract is hard and will not readily yield to the liquor, the valves 10 and 15 are opened and the valves 11, 12, and 16 are closed. The path of the liquid will be through the branch pipe to the exhaust-pipe 11, thence to the pump, thence through the pipe 9 to the branch pipe 14, and thence into the vat above the false bottom. This stream of liquor forced into the vat through the bottom causes violent agitation of the hard extracts, and thus causes them rapidly to dissolve. After the liquor has received the desired quantity of extract it may be pumped out of the vat by any suitable pumping means not necessary to be shown.

It will be seen from the foregoing description that under the construction shown provision is made for meeting every emergency that arises in the use of apparatus of this character.

Having thus fully described my invention, what I claim as new, and desire to secure by Letters Patent, is—

1. An apparatus of the character specified, comprising a vat, a perforated false bottom arranged therein, an exhaust-pipe communicating with the vat at points above and below the said bottom, a supply-pipe communicating with the vat at a point near the top thereof, branch pipes communicating with the supply-pipe and discharging tangentially into the vat eccentric to the vertical axis thereof, and valves for controlling the passage of liquor through the said pipes.

2. An apparatus of the character specified, comprising a vat, a perforated false bottom arranged therein and provided with a cone-shaped extract-deflecting portion, an exhaust-pipe communicating with the vat at points above and below the said bottom, a supply-pipe communicating with the vat at a point near the top thereof, branch pipes communicating with the supply-pipe and discharging tangentially into the vat above and below the said bottom, eccentric to the vertical axes of the vat, valves for controlling the passage of liquor through the said pipes, and heating means disposed below the said bottom.

In testimony that I claim the foregoing as my own I have hereto affixed my signature in the presence of two witnesses.

FARRAND C. PRINDLE.

Witnesses:
C. A. MARGESON,
J. A. BAUMGARTEN.